United States Patent [19]

Weh et al.

[11] Patent Number: 5,209,528
[45] Date of Patent: May 11, 1993

[54] PRESSURE-TIGHT PLUG COUPLING

[76] Inventors: Erwin Weh; Wolfgang Weh, both of Siemensstr. 5, D-7918 Illertissen, Fed. Rep. of Germany

[21] Appl. No.: 457,801
[22] PCT Filed: Apr. 27, 1988
[86] PCT No.: PCT/EP88/00352
 § 371 Date: Jan. 16, 1990
 § 102(e) Date: Jan. 16, 1990
[87] PCT Pub. No.: WO89/00655
 PCT Pub. Date: Jan. 26, 1989

[30] Foreign Application Priority Data

Jul. 17, 1987 [DE] Fed. Rep. of Germany ... 8709818[U]
Sep. 23, 1987 [DE] Fed. Rep. of Germany ... 8712845[U]

[51] Int. Cl.⁵ .......................................... F16L 37/18
[52] U.S. Cl. .................................... 285/315; 285/316; 285/375
[58] Field of Search ............... 285/316, 375, 315, 920, 285/320

[56] References Cited

U.S. PATENT DOCUMENTS

| | | | |
|---|---|---|---|
| 2,070,013 | 2/1937 | Krannak | 285/316 |
| 2,631,872 | 3/1953 | Wurmser | 285/316 X |
| 2,727,759 | 12/1955 | Elliott | 285/316 X |
| 2,887,124 | 5/1959 | Mehl | 285/920 X |
| 3,039,794 | 6/1962 | De Cenzo | 285/316 X |
| 3,234,965 | 2/1966 | Anderson | 285/316 X |
| 3,435,848 | 4/1969 | Johnston | 285/316 X |
| 3,454,047 | 7/1969 | Johnston | 285/316 X |
| 3,503,637 | 3/1970 | Sosaburo Maeshiba | 285/375 X |
| 3,684,321 | 8/1972 | Hundhausen et al. | 285/316 |
| 3,778,092 | 12/1973 | Magorien | 285/316 |
| 3,997,196 | 12/1976 | Karcher et al. | 285/316 X |
| 4,395,051 | 7/1983 | Tonomura | 285/316 X |

FOREIGN PATENT DOCUMENTS

| | | | |
|---|---|---|---|
| 2385970 | 12/1978 | France | 285/316 |
| 1104697 | 2/1968 | United Kingdom | 285/316 |
| 2081831 | 2/1982 | United Kingdom | |

Primary Examiner—Eric K. Nicholson
Assistant Examiner—Heather Chun
Attorney, Agent, or Firm—Spensley Horn Jubas & Lubitz

[57] ABSTRACT

A plug coupling for providing a pressure-sealed connection to a device having a cylindrical connector. The coupling has a tube-like support element having a front portion provided with a sealing ring and a rear portion formed as an inlet part. Elongated clamping jaws are linked to the support element and extend in a generally axial direction. The clamping jaws are arranged concentrically around a longitudinal axis of the support element and have free ends radially displaceable. A sleeve surrounds the support element and is shiftable in longitudinal direction and has a front end portion provided with a rim for engaging peripheral surfaces of the clamping jaws for locking them in an engaged position. The sleeve is urged into the engaged position either by a spring or by pressure. An arresting device blocks the sleeve to prevent this engagement of the plug coupling when fluid pressure is applied thereto.

8 Claims, 10 Drawing Sheets

PRESSURE-TIGHT PLUG COUPLING

FIELD OF THE INVENTION

The invention relates to a pressure-tight plug coupling for providing a pressure-sealed connection to a device provided with connecting means. Such plug couplings are particularly useful for fast and one-handed connection to and disconnection from the connecting means of such a device. By way of example, pressure sensitive elements may be tested by temporary application of a pressurized medium through such plug coupling.

BACKGROUND OF THE ART

In our U.S. patent application Ser. No. 862,936, now U.S. Pat. No. 4,716,938, issued Jan. 5, 1988, we have disclosed a plug coupling of the type defined above constituting a pressure-tight plug coupling for a connecting means provided with a male or female threading. In a cylindrical housing a piston is shiftably mounted. A plurality of clamping jaws engages a front portion of the piston in a concentric arrangement about a longitudinal axis of the housing, the free ends of the clamping jaws being radially displaceable by means of a ramp arrangement during movement of the piston in an outward direction of the longitudinal axis relative to the housing, a pressure being applied against the rear end of the piston in order to move the clamping jaws in either of a connected and a disconnected position. In the absence of pressure, the piston is pulled into the interior of the housing by means of a compression spring arranged between the interior of the housing and the rear end of the piston. With one type of known plug coupling for a male threading connection, the piston is guided on a core, provided at its front end portion with a sealing element, shiftable in the axial direction by a limited distance and sealingly engaging an end surface of the male threaded connector upon application of the plug coupling. Fluid to be supplied through the connector is supplied through a laterally attached inlet port into the cylindrical housing and from there through the hollow core to the connection. The means applying pressure to the piston is formed either as a handle acting through a stud onto the rear end face of the piston or as a pressure fluid source exerting a corresponding pressure to the rear end face of the piston.

The forced back and forth axial movement of the piston may alternatively be accomplished by applying air under-pressure either to the rear end of the piston or to a piston surface forming part of a front pressure chamber. Such an alternative application of pressure is accomplished by shifting a sleeve arranged on the peripheral surface of the housing in the axial direction.

The known device has a stable construction and is easy to handle, in particular when a handle is used for activation. However, there are various applications where the size of the coupling is too large and the passage of the fluid is limited. Also, the costs of manufacture are only justified for operation at very high pressures.

SUMMARY OF THE INVENTION

It is an object of the present invention to provide a plug coupling having a simple and compact design.

It is a further object of the present invention to provide a plug coupling offering maximum throughput of fluid.

It is a still further object of the present invention to provide a plug coupling with improved safety.

These and other objects of the invention are achieved by a plug coupling for providing a pressure-sealed connection to a device provided with an essentially cylindrical connecting means having a cylindrical inlet of a predetermined first diameter and provided with means for engagement of said plug coupling, comprising: a tube-like support element having a rear portion and a front portion provided with sealing means for sealing contact to said connecting means; elongated clamping jaws having first ends linked to said front portion of said support element and extending in a generally axial direction, said clamping jaws being concentrically arranged around a longitudinal axis of said support element and having free second ends radially displaceable; a sleeve essentially surrounding said support element, shiftable in a direction of said longitudinal axis relative to said support element and having a front end portion provided with a rim for engaging peripheral surfaces of said clamping jaws for locking them in an engaged position and releasing said clamping jaws for radial displacement, upon shifting said sleeve in a released position; means for radially displacing said second front ends of said clamping jaws upon shifting said sleeve into said released position; an inlet part provided at said rear portion of said support element; and means for urging said sleeve into said engaged position.

DESCRIPTION OF PREFERRED EMBODIMENTS OF THE INVENTION

Since we have explained the principal elements of a plug coupling of the type the invention is related to in our U.S. Pat. Nos. 4,543,995 and 4,716,938, the following description relates in the main to the modified elements of the novel plug coupling which, for example, may serve for connecting a pressure line to a connector of any type of device.

Figure 1:
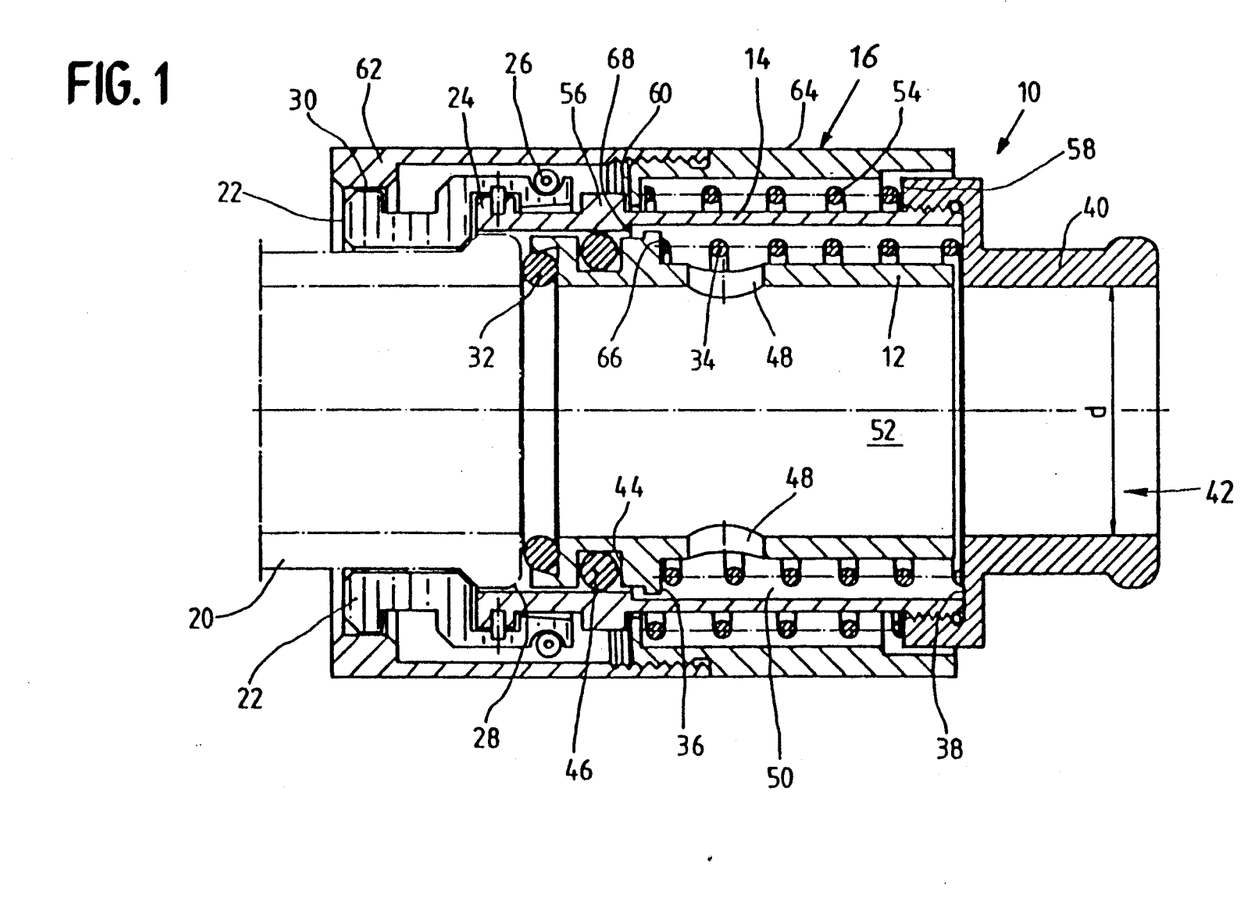
FIG. 1 is an axial sectional view through a plug coupling of a first embodiment of the invention with an inlet arranged in axial direction of the coupling.

FIG. 1 shows a first embodiment of a plug coupling 10 according to the invention comprising a support element 14 of cylindrical shape, an inner sealing cylinder 12 and a sleeve 16 shiftably mounted on a circumferential surface of the support element 14. For example, the plug coupling 10 of this embodiment shall be used for fast and simple attachment to a connector 20 having no threadings, the coupling assuring a secure sealing even upon application of very high pressure. For this purpose, at the front portion of the support element 14, clamping jaws 22 are provided which are preferably hinged as individual parts into a front rim 24 of the support element 14 as it has been explained in detail in our above-mentioned U.S. Pat. No. 4,716,938. A circumferentially extending spiral spring 26 surrounds the rear ends of the clamping jaws 22 such that the front ends of the clamping jaws are urged radially outward (see FIG. 2 of that patent) forming a type of tunnel enhancing the insertion of the connector 20. In this embodiment, the connector 20 comprises a peripheral front rim 28 for engagement by the clamping jaws 22 behind it. Specifically, the clamping jaws 22 grip behind the rim 28 when pressed radially inward, upon shifting the sleeve 16 in FIG. 1 to the left, by the annular ramp surface portion 30 of sleeve 16. In the end position of the sleeve 16, the clamping jaws 22 are locked by the cylindrical inner surface of the portion 30 in a position illustrated in FIG. 1. In this position a sealing ring 32 inserted into an annular recess at the face end of the sealing cylinder 12 is pressed against the front end face surface of the connector 20, in particular by a compression spring 34 extending from an exterior stop 36 of the sealing cylinder 12 around the periphery in the rearward direction to an end surface 38 of an inlet part 40 which, with the instant embodiment, is sealingly screwed onto the rear end of the support element. 14. An inner passage 42 of the inlet part 40 has a diameter p preferably corresponding essentially to the inner diameter of the sealing cylinder 12 and of the connector 20. Fluid supplied to the inner passage of inlet part 40 flows uniformly without any whirl forming, which otherwise may be caused by constrictions, to the connector 20.

Between the sealing ring 32 and the stop 36, a further sealing ring 46 is inserted in a circumferential groove 44 of the sealing cylinder 12. It should be noted that the sealing cylinder 12 is provided with radial passages 48 allowing the fluid to flow from an interior space 52 to an intermediate space 50 between the sealing cylinder 12 and the support element 14. Due to the difference in piston areas a pressure is exerted on the stop 36, which pressure increases as the pressure in the interior space 52 increases. This means that the plug coupling according to the invention is self-securing.

Due to the influence of a further compression spring 54, the sleeve 16 may be maintained normally in a position locking the clamping jaws 22, the movement of the sleeve 16 in the forward direction being limited by a stop 56 projecting from the exterior peripheral surface of the support element 14. Radial opening of the clamping jaws 22 occurs upon shifting the sleeve 16 against the pressure of the compression spring 54 in the rearward direction, i.e. in FIG. 1 to the right. This releases the clamping jaws 22 which are urged radially outward due to the pressure of the spiral spring 26. In the rearward direction, axial movement of the sleeve 16 is limited by a further stop, for example, provided at a rim 58 of the inlet part 40. At this rim 58 the compression spring 54 may be supported, spring 54 engaging with its front end an inner flange 60 of the sleeve 16.

As illustrated in FIG. 1, the sleeve 16 is formed of two parts, namely a front part 62 which is screwed to a rear part 64.

It should be mentioned that the extent of axial movement in the forward direction of the sealing cylinder 12 is limited by suitable projections 66 and 68 provided at the exterior peripheral surface of the sealing cylinder 12 and at the interior periphery of the support element 14, respectively.

In practice, the inlet part 40 will have attached to its outer peripheral surface a hose or the like. For applying the plug coupling 10 it is only necessary to retract the sleeve 16 relative to the support element 14 against the force of the compression spring 54 such that the radially opened clamping jaws 22 are positioned behind rim 28. In this situation the sealing ring 32 comes into resilient engagement with the end face surface of the connector 20. When the sleeve 16 is released, it is moved forward due to the pressure of the compression spring 54, i.e. in FIG. 1 to the left, causing the clamping jaws 22 to be urged inward into a position shown in FIG. 1 and to be locked there. The pressure of the supply fluid causes the sealing cylinder 12 to press the sealing ring 32 strongly against the end surface of the connector 20. For removing the plug coupling, again it is only necessary to slightly withdraw the sleeve 16, i.e. to move it in FIG. 1 to the right, which movement releases the clamping jaws 22 so that they pivot radially outward, such that the plug coupling slides from the connector 20 upon further withdrawing of the sleeve 16. It should be noted that the withdrawal of the sleeve is possible only after removal of the fluid pressure.

Figure 2:
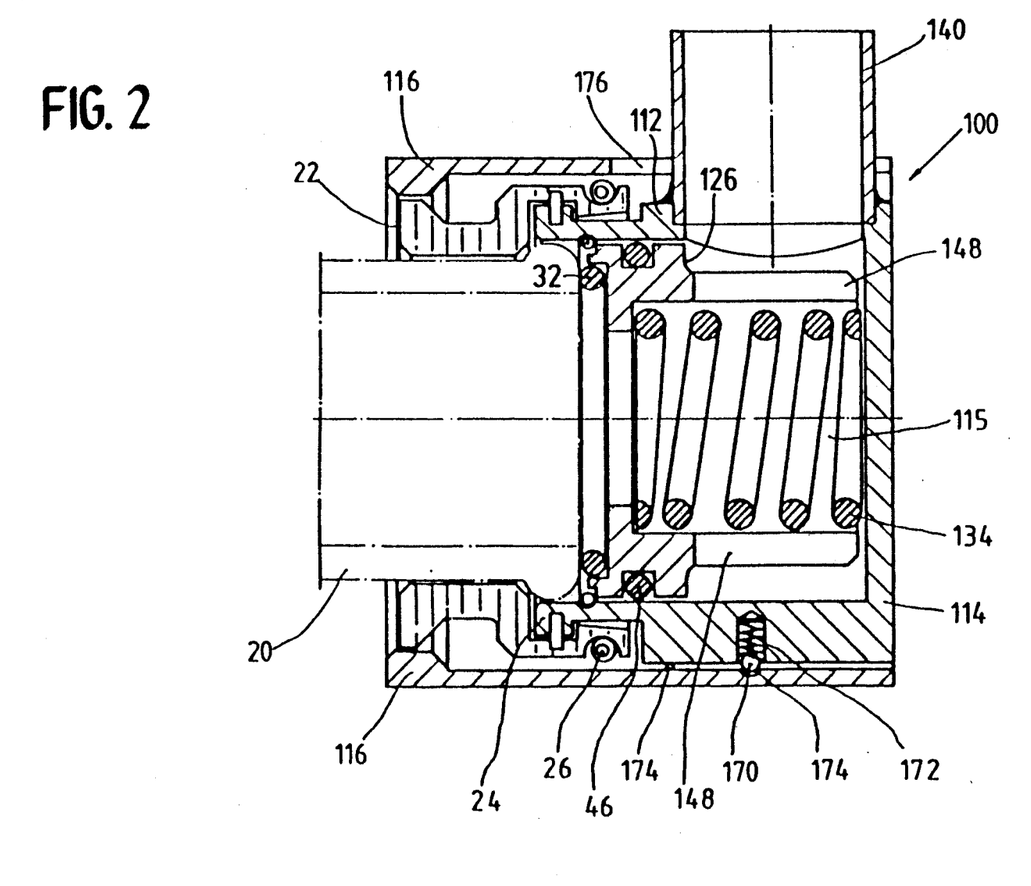
FIG. 2 is an axial sectional view through a second embodiment with an inlet whose axis is arranged perpendicular to the longitudinal axis of the coupling.

FIG. 2 shows a second embodiment of a plug coupling 100 according to the invention using a lateral inlet part for supplying fluid. Elements corresponding to those explained in connection with FIG. 1 are marked with similar reference numerals and their explanation is omitted.

Different from the embodiment according to FIG. 1 is in particular a support element 114 having a cylindrical passage 115 in which a sealing cylinder 112, considerably shorter than cylinder 12, is urged in axial direction by the pressure of a compression spring 134. The sealing ring 32, again arranged in a recess of the front end of the sealing cylinder 112, serves for engagement with the end surface of the connector 20 when attaching the plug coupling. With the present embodiment, an inlet part 140 is attached laterally, in particular perpendicular, to longitudinal axis of the coupling, to the support element 114. Due to relatively large recesses provided in the rear portion of the sealing cylinder 112, fluid may enter into the passage 115 without any obstructions.

As an alternative to the arrangement of FIG. 1, in the instant embodiment a sleeve 116 is provided without biasing by an axially acting compression spring. The sleeve 116 is shiftable in axial direction relative to the passage 115 and the connector 20. For securing the sleeve 116 in the engaged position with the connector 20 an arresting means may be provided which, for example, may comprise a ball 170 pressed by a spring 172 against a recessed portion 174 provided in the interior surface of the sleeve 116. A further recessed portion 174 may be provided for arresting the sleeve 116 in the open position of the plug coupling.

It should be mentioned that the sleeve 116 in the region of the inlet part 140 is provided with an appropriate recess 176 permitting an axial shifting of the sleeve 116 relative to the inlet part 140.

As with the first embodiment, the clamping jaws 22 are evenly distributed circumferentially around the front portion of the cylindrical rim 24 of the support element 114.

It should be noted that due to the larger piston area at a rim 126 as compared with a piston area corresponding essentially to the inner diameter of the connector 20, the sealing cylinder 112 is pressed by the pressure of the supplied fluid to the end surface of the connector 20 which again results in a self-securing of the plug coupling.

The other design features as well as the operation of the plug coupling according to the second embodiment correspond to those of the first embodiment with the exception that the sleeve 116 is brought into either of the two positions by hand and locked there, namely into the open engaging position and into the clamping position having the clamping jaws arrested.

Figure 3:
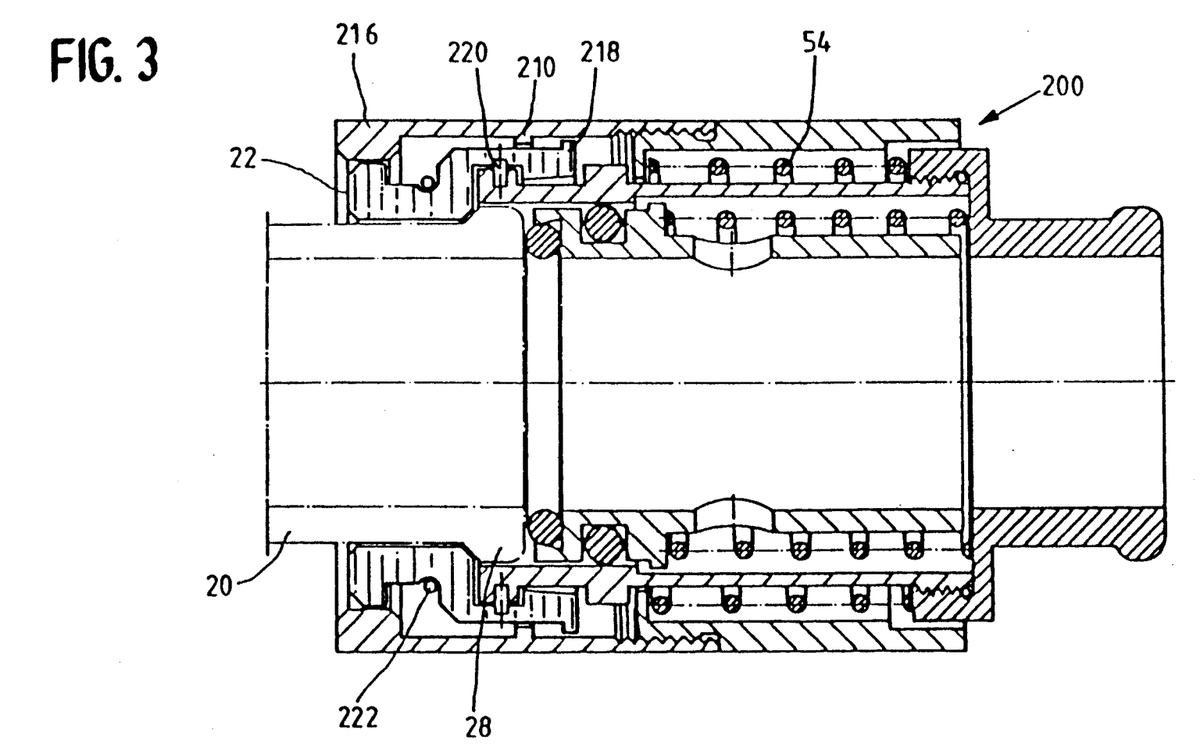
FIG. 3 is an axial sectional view of a third embodiment of a plug coupling similar to that of FIG. 1.

FIG. 3 shows an embodiment which is modified as compared with the embodiment of FIG. 1 in respect of the clamping jaws and their actuation. This third embodiment provides a plug coupling 200, the opening of the clamping jaws 22 being accomplished upon withdrawal of the sleeve 216 by a stop 210 projecting from the inner peripheral surface of the sleeve 216 and engaging a rim 218 provided at the rear ends of the clamping jaws 22 and projecting radially outward. This movement results in a tilting of the clamping jaws about their hinge points 220.

Figure 4:
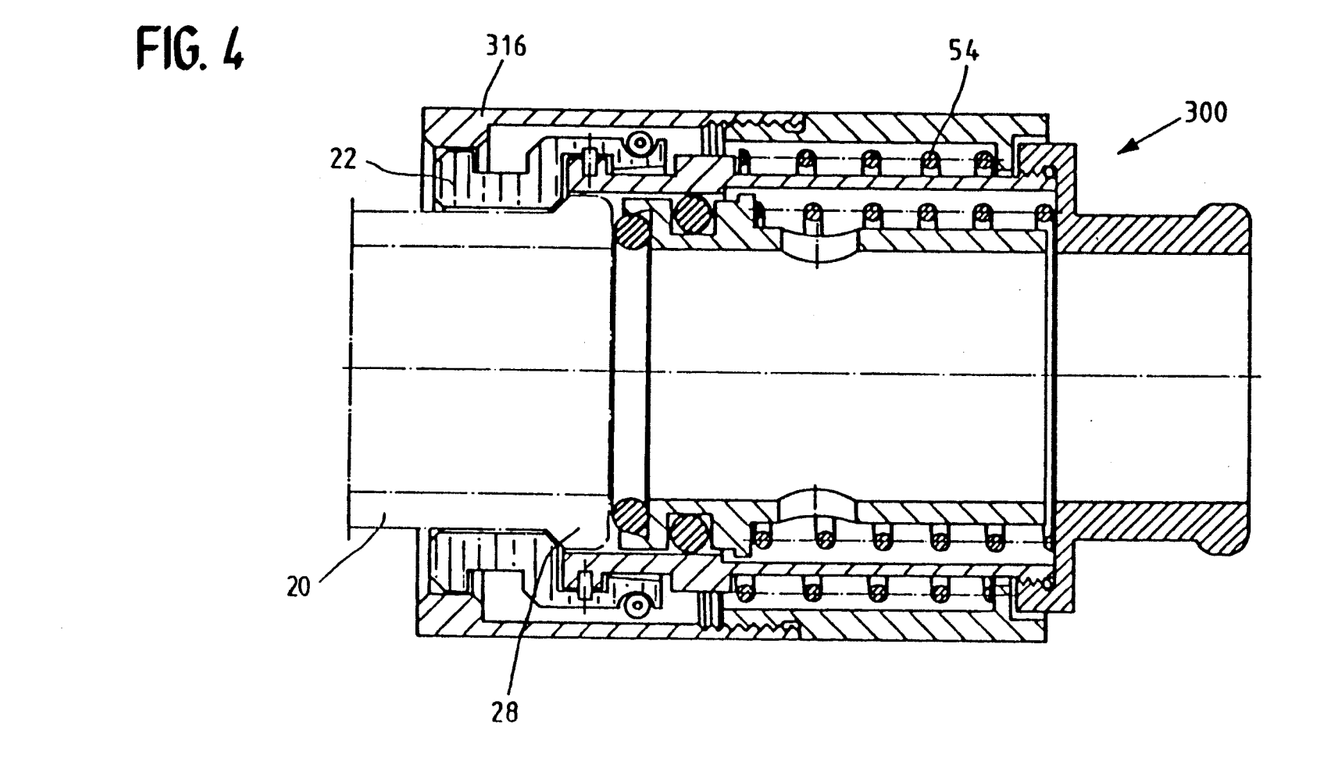
FIG. 4 illustrates a plug coupling of the fourth embodiment of the invention modified in respect of the embodiments according to FIGS. 1 and 3.

FIG. 4 shows an embodiment which is further modified in respect of FIG. 1 and which provides a plug coupling 300 having a sleeve 316 which is moved in forward direction, i.e. in FIG. 4 to the left, for releasing the clamping jaws 22 against the force of the compression spring 54. Releasing the sleeve 316 after the clamping jaws 22 have engaged behind the rim 28 of the connector 20 results in pulling the sleeve 316 by means of the compression spring 54 into the position illustrated in FIG. 4 in which the clamping jaws 22 are locked.

Finally, it should be noted that the mounting of the clamping jaws at the support element and the radial displacement thereof may be accomplished by various other measures as illustrated in our above-mentioned U.S. Pat. Nos. 4,543,995 and 4,716,938.

For the above explained embodiment it has been assumed that the connector 20 is not provided with a threading. However, the plug coupling according to the instant invention is applicable as well for connectors provided with a male threading. In this case the clamping jaws are provided with a threading as well, as explained in detail in the above-mentioned U.S. Patents. The sealing cylinder has so much play that a definite engagement of the clamping jaws 22 in the male threading is assured without damaging the threading.

Preferably, with the embodiment according to FIG. 3 there is provided a circumferential spring 222 radially pressing the front ends of the clamping jaws 22 inward, in particular for threaded connectors, upon shifting the sleeve 216 in forward direction.

Figure 5:
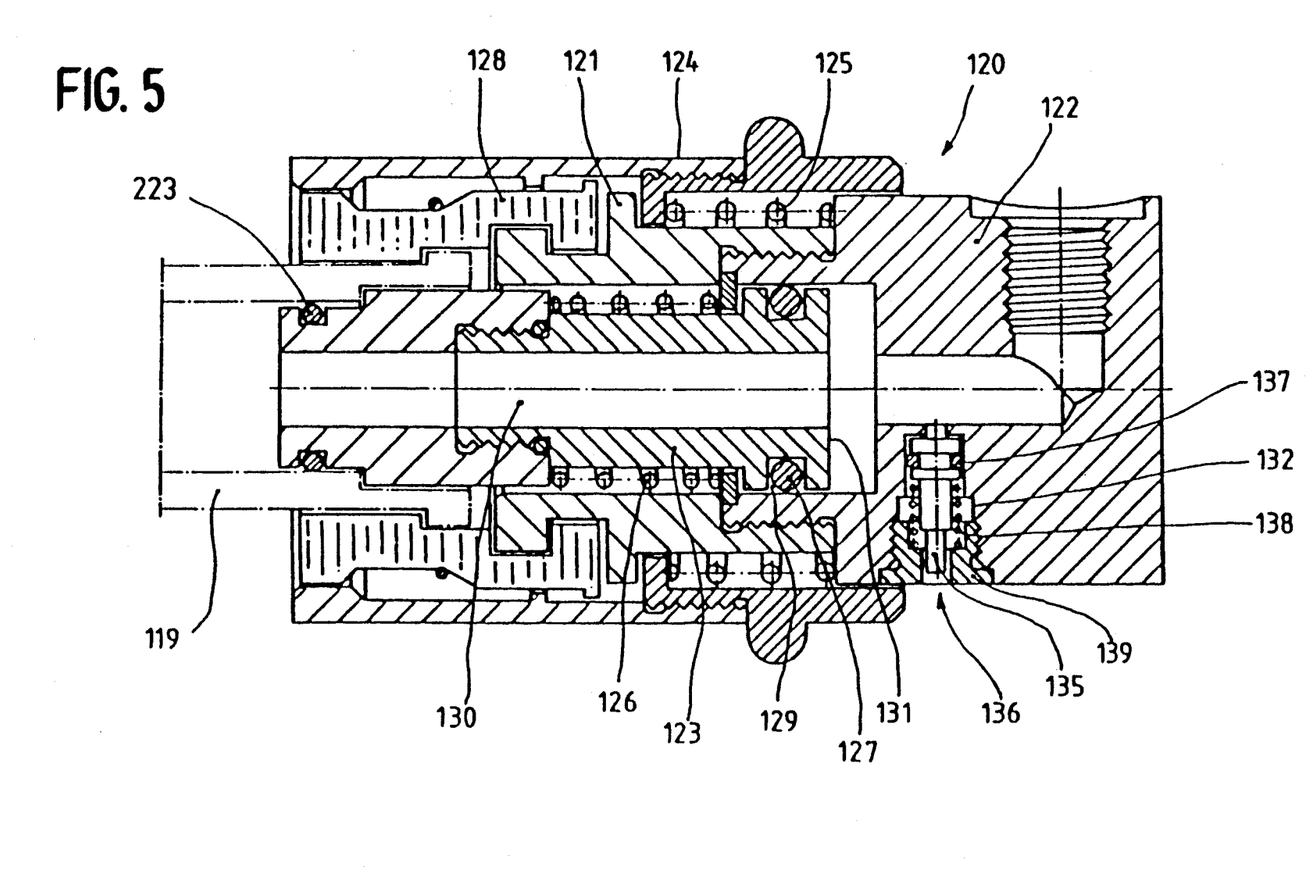
FIG. 5 is a sectional view of a fifth embodiment of the invention provided with safety means.

FIG. 5 shows a fifth embodiment of the invention particularly applicable with very high pressures. In such a situation particular attention must be given to the safety of the device. Again, only the novel features and elements of this embodiment are explained below.

A plug coupling 120, in principle, comprises a support element 121 fixed to a rear inlet part 122 and provided with clamping jaws 128 at its front end. Within the support element 121 and part of the inlet part 122, a piston 123 is shiftable in axial direction of the coupling. A sleeve 124 riding on the support element 121 and the exterior of the inlet part 122 is urged forward by a spring 125. A spring 126 urges the piston 123 in forward direction. An annular seal 127 is provided in an annular groove 129 at the rear end of the piston 123 for sealing a central passage 130 from the exterior parts, in particular from spaces in which the springs 125 and 126 are arranged.

A rear end surface 131 of the piston 123 has a larger diameter than the central passage 130.

The inlet part 122 is provided with a radial recess generally marked with 132 extending from the central passage 130 to the periphery of the inlet part 122. In the recess 132 a locking device 136 is arranged for blocking the sleeve 124 in the engaged position shown in FIG. 5 to prevent sleeve 124 from being retracted to the rear.

Specifically, the locking device 136 comprises a stud 135 provided with a sealing ring 137 and urged radially inward by a compression spring 138 bearing against a closure member 139 screwed into the recess 136 such that the outer end surface of member 139 is essentially flush with the peripheral surface of the inlet element 122.

When no pressure fluid is applied from the inlet part 122 through the central passage 140 to a connector 119, the stud 135 is fully within the recess 136. Upon pressure application, the stud 135 is urged radially outward to block any unintentional withdrawal or retraction of the sleeve 124. Upon pressure release in the central passage 130, the spring 138 urges the stud 135 radially inward such that the sleeve 124 may be moved as explained before. Connector 119 engages a rim sealing ring 223 carried by piston 123.

It should be noted that due to the sealing ring 127 all exterior elements, as springs 125 and 126, are isolated from the flow of fluid, which may be of importance when this fluid is an aggressive substance.

Figure 6:
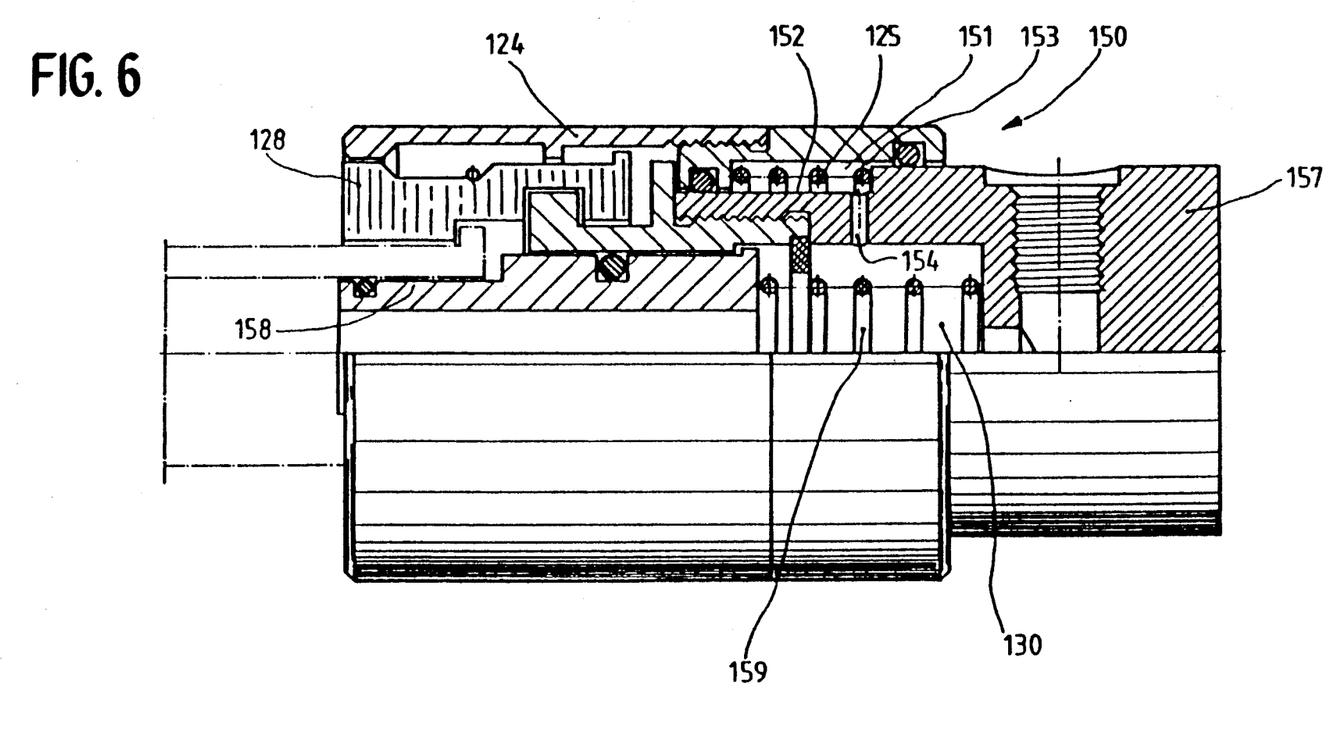
FIG. 6 is a sectional view of a sixth embodiment of the plug coupling of the invention provided with different safety means.

FIG. 6 shows a sixth embodiment of the present invention with a plug coupling 150 featuring a different type of self-securing in a very simple manner. With this embodiment the spring 125 is arranged in an annular recess 151 which is formed between an outer peripheral surface 152 and an interior peripheral surface 153 of the sleeve 124.

In contrast to the embodiment of FIG. 5, the central passage 130 is connected to the space 151 by at least one, and preferably a plurality of, bores 154 circumferentially distributed around the inlet part 157.

In the absence of fluid pressure in the central passage 130, the sleeve 124 may be moved rearward (in FIG. 6 to the right) in order to radially open the clamping jaws 128. However, upon application of pressure by supplying fluid to the central passage 130, such fluid pressure is transmitted to the space 151 where it acts to firmly urge the sleeve 124 in forward direction as long as fluid pressure is present in the central recess 130.

It should be noted that with this embodiment according to FIG. 6, a sealing cylinder 158 is used consisting of just one integral part. Furthermore, a compression spring 159 is arranged within the central passage 130 so as to press against an end surface of the piston 158.

Figure 7:
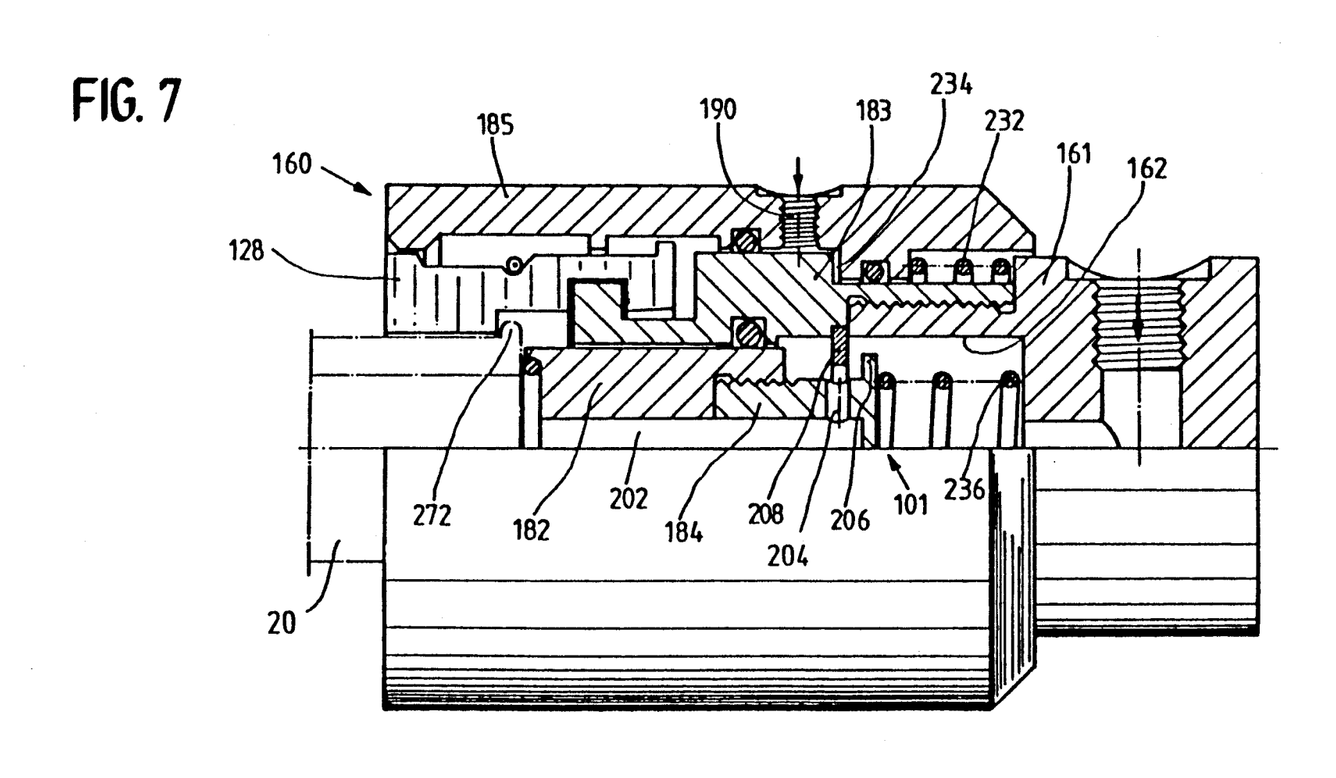
FIG. 7 is a sectional view of a seventh embodiment of the invention using a further safety means.

FIG. 7 shows a further embodiment of the invention using a valve 101 as a self-securing means for a plug coupling 160.

A sealing piston 182 has screwed to its rear end surface a bolt 184 having its rear end portion formed as a radially extending flange 206. The bolt 184 is provided with a radial through-hole 204 extending from its exterior periphery to a central passage 202. The through-hole 204 (or a plurality of circumferentially distributed through-holes) is provided at a certain distance from the rear end portion 206 of the bolt 184.

A metal ring 208 is fixed in an annular groove provided in the interior peripheral surface of a support element 183.

Part of the rear end surface of the metal ring 208 faces the front end surface of the flange 206 for engagement therewith. For a tight sealing the metal ring 208 may be provided with a rubber coating.

FIG. 7 shows the plug coupling connected to a connector 20 in a locked position. In this position the sealing piston 182 is retracted such that there is a gap between the metal ring 208 and the flange 206 of the bolt 184; thus, fluid may flow, through an inlet part 161 provided with a space 162, to the central passage 202.

When attaching the plug coupling to the connector 20, no fluid pressure is applied to the coupling. Thus the sealing piston 182 is moved rearward against the slight pressure of a pressure spring 236. As soon as the sleeve 185 is in locking position, as shown in FIG. 7, pressure fluid may be applied to the plug coupling.

When the sleeve 185 is pulled rearward, intentionally or unintentionally, the clamping jaws 128 release the rim 272 of the connector 20. Valve 101 immediately closes since the bolt 184 is moved forward due to the force of the spring 236 and, in addition, due to the pressure of the pressure fluid. Thus, the opposing surfaces of the metal ring 208 and 206 come into tight engagement.

As a modification in respect to the other embodiments, shifting of the sleeve 185 to the rear may be accomplished by connecting a pressure source to an inlet 190 extending radially through the wall of the sleeve 185 to a pressure space 234. Thus the sleeve 185 is moved to the rear against the pressure of a spring 232.

It should be noted that the plug couplings according to the embodiments of the invention may be used either for applying a pressure fluid or for applying a vacuum to any desired device. For applying pressure, the diameter of the sealing ring 127 of FIG. 5 is selected larger than that of the sealing ring 223. Thus, upon application of pressure to the plug coupling, due to the different piston areas, there is a pressure support for engaging the piston 123 which is pressed even more firmly to the connector 20 or 119, respectively. For very low pressures, the diameters of the two sealing rings may be made essentially equal provided that a strong compression spring is used.

When applying a vacuum through the plug coupling, the diameters of the sealing rings will be reversed.

If the inlet part is closed, the device represents a plug.

By modifying the stops and guiding surfaces at the clamping jaws and the sleeve, the direction of movement of the sleeve may be reversed which means that the sleeve is pulled forward for opening the clamping jaws while for releasing the sleeve the latter will be pulled by means of the force of the spring over the clamping jaws. Though with the various embodiments connectors without threadings are shown, the interior peripheral surfaces at the interior end portion of the clamping jaws may be provided with threadings to engage a male threading of a connector. Since the clamping jaws are just hinged into the support element, they may be easily exchanged by others. The principle of the invention is applicable to connectors with female threading as explained in our U.S. Pat. No. 4,543,995. It should be noted that the clamping jaws engage the connector with large contacting surfaces. Thus even larger tolerances of the size of the connector are acceptable. Adapting the plug coupling to various types of connectors may be accomplished without difficulty.

Figure 8:
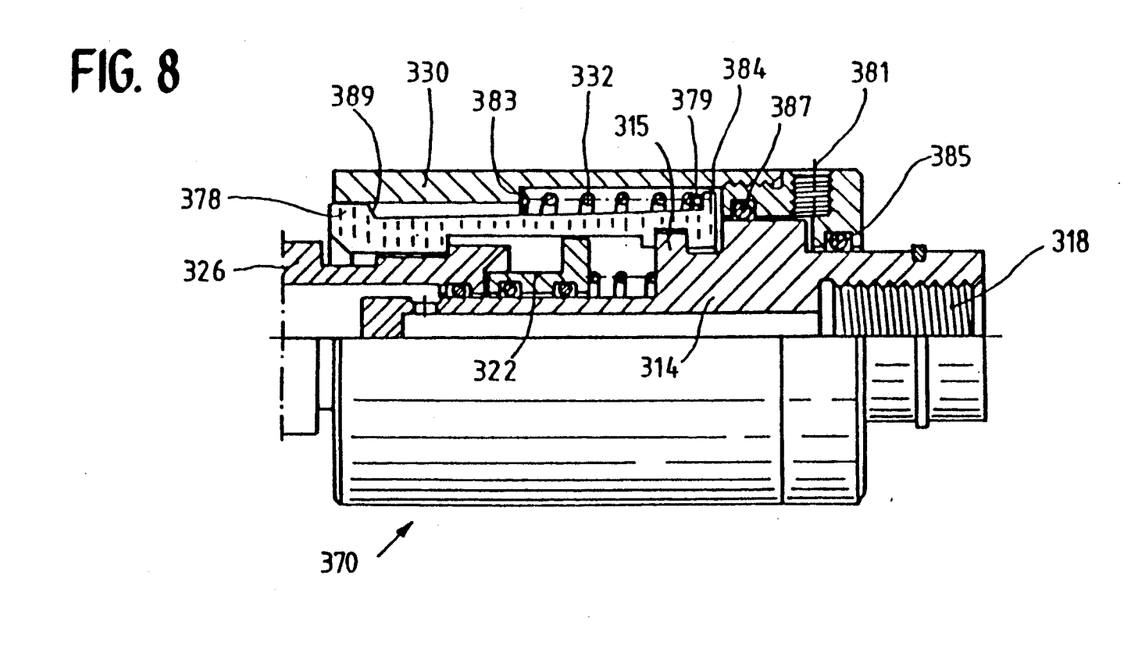
FIG. 8 is a view partially in section of an eighth embodiment of the invention.

FIG. 8 shows another embodiment of the present invention featuring a particularly simple design and high effectiveness.

Specifically, on a support element 314 a sealing piston 322 is arranged to be movable in the axial direction in order to engage a connector 326. Clamping jaws 378 having long forward ends are hinged to a rim 315 and are surrounded by a sleeve 330. In the connected position according to FIG. 8, in an annular space between the interior peripheral surface of the sleeve 330 and the exterior peripheral surfaces of the clamping jaws 378 a compression spring 332 is arranged, bearing with its front end against an annular stop 383 of the sleeve 330 and with its rear end against radial projections 384 at the rear ends of the clamping jaws 378. Preferably, a flat ring 379 surrounds the clamping jaws 378 and distributes the force of the spring 332 evenly to the clamping jaws 378.

To the rear, the support element 314 ends in an inlet portion 318 formed coaxially to the longitudinal axis of the coupling. The rear portion of the sleeve 330 is provided with a radial inlet 381 for applying pressure to a space formed between a rear sealing ring 385, a front sealing ring 387 and the opposing peripheral surfaces of the support element 314 (and its inlet portion 318) and of the sleeve 330. Applying pressure to the inlet 381 causes the sleeve 330 to be pulled rearward, in FIG. 8 to the right, releasing the front ends of the clamping jaws 378 for radial outward movement caused by the compression spring 332 which presses against the projections 384 of the clamping jaws 378 or against the flat ring 379. Removing pressure from the inlet 381 permits the sleeve 330, under pressure of the compression spring 332, to move forward, in FIG. 8 to the left, a front inner edge of the sleeve 330 engaging a ramp surface 389 of the clamping jaws 378. Thus, the clamping jaws 378 engage the connector 326 as explained in connection with the other embodiments.

With this embodiment the compression spring 332 acts both for shifting the sleeve 330 and for tilting the clamping jaws 378.

Figure 9:
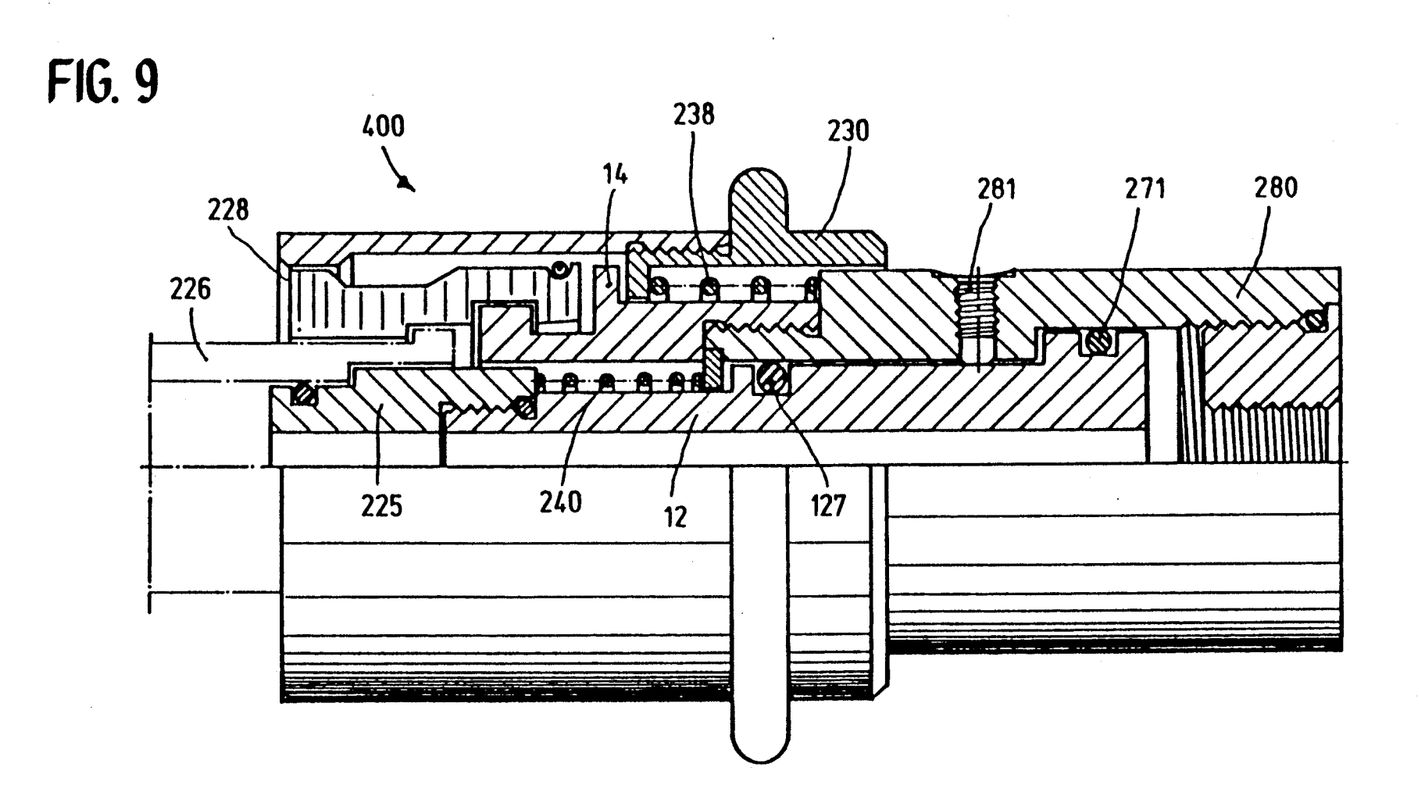
FIG. 9 is a view partially in section of a ninth embodiment of the invention.

FIG. 9 shows a further embodiment of a plug coupling 400 according to the invention needing only a reduced amount of force for operation.

There is provided a body 280 having the support element 14 provided at its front end and being provided with a radial bore 281 leading to a pressure space defined between sealing rings 127 and 271.

Upon application of pressure to the bore 281, the piston 12 provided at its front with the sealing member 225 is withdrawn against the force of the compression spring 240. Shifting back of the sleeve 230 in FIG. 9 to the right causes a radially outward movement of the front ends of the clamping jaws 228. Thus, the coupling may be attached to the connector 226 quickly and safely with one single grip. Releasing the sleeve 230 causes the latter to move over the front ends of the clamping jaws 228. This safely fixes the coupling. Now, if the pressure is removed from the bore 281 compression spring 240 pushes the sealing element 225 into the connector 226 ensuring a tight and firm connection.

It should be noted, that applying pressure to the piston 12 may not only be used for movement of the piston in one direction; additionally or instead of the compression spring 240, pressure may be applied to the piston 12 to move the latter in FIG. 9 to the left. For this purpose pressure switching may be used as explained in detail in the above-mentioned U.S. Pat. No. 4,543,995.

With the foregoing embodiments the sealing element for engaging the connector was explained as being a part separate from the support element. However, as FIGS. 10 and 11 show, in cases where no exact axial positioning is required the sealing element may be integral or unitary with the support element.

Figure 10:
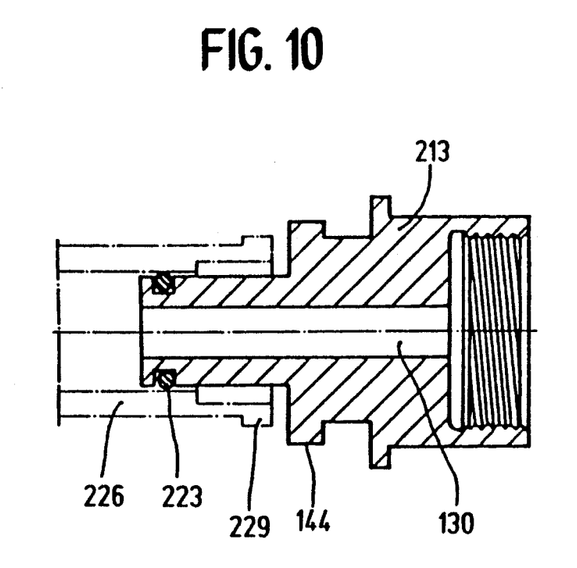
FIGS. 10 and 11 are cross-sectional views of modifications of the various embodiments.
Figure 11:
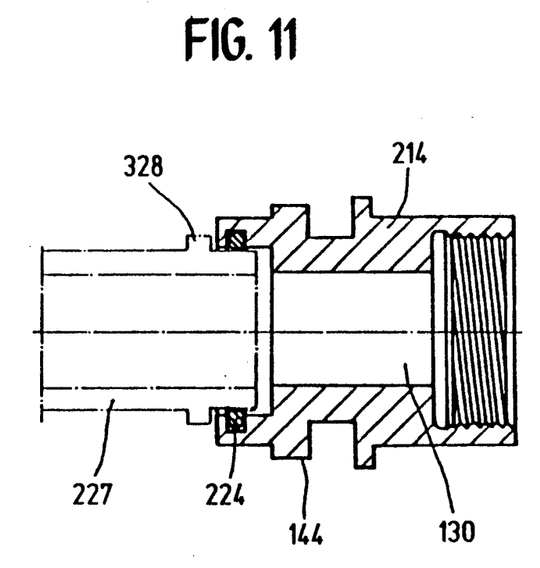

Thus, FIG. 10 and 11 show a support element 213, 214 with a central passage 130 and provided with a circular rim 144 for mounting the clamping jaws (not shown) as with the foregoing embodiments.

While FIG. 10 shows a female connector 226 for inserting a male portion of the support element 213, provided with a rim sealing 223, FIG. 11 shows a male-type connector 327 where the sealing is accomplished by a sealing 224 pressing against the outer peripheral surface of the front portion of the connector 227.

With the embodiments according to FIGS. 10 and 11 the axial dimensions of the front sealing portions of the support elements 213, 214 and the position of the outer circular rims 229, 328 on the outside of the connectors 226 and 327, respectively, are selected such that there is a certain play for inserting or attaching the support element 213 and 214, respectively, to the connectors 226 and 227 which does not obstruct the engaging of the clamping jaws behind the rims 229 and 328, respectively.

It is understood that the design of the support elements 213 and 214 of the embodiments according to FIGS. 10 and 11 results in a particularly simple, stable and cost effective plug coupling, the more so since the sealing at 40 (FIG. 1) may be omitted.

It should be noted that while using similar principles with all the embodiments various features, as the specific position of the springs and sealings, and corresponding stops have been modified for different embodiments. Most of these features are exchangeable for the various embodiments and may be used in different combinations.

It should be noted, that the clamps, as 22 (FIG. 1), could be axially fixed by forming hook-like clamps ends engaging a circular groove around the support element 14, rather than providing a rim 24 at the end of the support element 14 and inner recesses at the clamps 22.

We claim:

1. A plug coupling for providing a pressure-sealed flow connection to a conduit member provided with an essentially cylindrical, radially outwardly protruding rim for engagement with said plug coupling, comprising:
    a tube-like support element having a longitudinal axis, a rear portion with an inlet part and a front portion for receiving the cylindrical rim of the conduit member;
    elongated clamping jaws having rear and front ends, the rear ends being linked to said front portion of said support element and extending in a generally axial direction, said clamping jaws being concentrically arranged around the longitudinal axis of said support element, said front ends of said clamping jaws being radially displaceable;
    a sleeve essentially surrounding said support element and shiftable parallel to said longitudinal axis relative to said support element between a released position and an engaged position;
    means for radially displacing said front ends of said clamping jaws upon shifting said sleeve into said released position;
    means for holding said sleeve in said engaged position; and
    a sealing cylinder separated from said support element, shiftable parallel to said longitudinal axis relative to said support element and biased in a direction from the rear portion to the front portion of said support element by a spring supported between said support element and said sealing cylinder, said sealing cylinder being sealed against said support element by a sealing ring;
    said sealing cylinder being provided with radial openings for permitting a pressure fluid which flows through said plug coupling to flow into a pressure space formed between said support element and said sealing cylinder, said sealing cylinder having a wall portion extending into the pressure space formed between said sealing cylinder and said support element, said wall portion of said sealing cylinder acting as a piston area loaded with the pressure fluid for securing the pressure-sealed connection of said plug coupling to the conduit member.

2. The plug coupling of claim 1, wherein
    said means for radially displacing are composed of a stop which projects radially inwardly from said sleeve, and a plurality of counterstops each projecting radially outwardly form said rear end of a respective clamping jaw to be engaged by said stop when said sleeve is shifted into said released position.

3. The plug coupling of claim 1 wherein said sealing cylinder has a front edge and the cylindrical rim of the conduit member has a front end surface which faces said front edge when the conduit member engages said plug coupling, and further comprising circular sealing means disposed at said front edge to form a seal between said front edge and the front end surface when the conduit member engages said plug coupling.

4. The plug coupling of claim 1 wherein said means for holding said sleeve comprise a spring surrounding said support element and held between said support element and said sleeve.

5. The plug coupling of claim 1, wherein said means for holding said sleeve in said engaged position comprise: means for arresting said sleeve in said engaged position, said arresting means being connected to communicate with the pressure fluid which flows through said plug coupling and being actuated by the pressure fluid.

6. The plug coupling of claim 5 wherein said arresting means comprises a stud mounted in a recess radially extending from said central passage to a periphery of said support element and a spring means urging said stud inward, said stud being pressed outward upon application of pressure fluid in order to project beyond said periphery blocking any movement of said sleeve.

7. The plug coupling of claim 5 wherein said arresting means comprises a bore extending radially from said central passage to a pressure space formed between said sleeve and said support element and having opposite first and second end surfaces, said first end surface being formed by an inward flange of said sleeve and said second surface being formed by an outward rim of said support element, said pressure space being sealed against said sleeve and said support element.

8. The plug coupling of claim 1 wherein: said elongated clamping jaws have peripheral outer surfaces; and said sleeve comprises a front end portion provided with a locking surface for engaging said peripheral outer surfaces of said clamping jaws when said sleeve is in said engaged position, said locking surface being separated from said peripheral outer surfaces of said clamping jaws when said sleeve is in said released position.

* * * * *